(12) United States Patent
de jesus Barajas

(10) Patent No.: US 11,192,571 B1
(45) Date of Patent: Dec. 7, 2021

(54) THREADED JOINT FOR STEERING COLUMN ADJUSTMENT MECHANISM

(71) Applicant: Steering Solutions IP Holding Corporation, Saginaw, MI (US)

(72) Inventor: Jose de jesus Barajas, Chihuahua (MX)

(73) Assignee: Steering Solutions IP Holding Corporation, Saginaw, MI (US)

( * ) Notice: Subject to any disclaimer, the term of this patent is extended or adjusted under 35 U.S.C. 154(b) by 9 days.

(21) Appl. No.: 16/890,763

(22) Filed: Jun. 2, 2020

(51) Int. Cl.
*B62D 1/184* (2006.01)
*B62D 1/185* (2006.01)

(52) U.S. Cl.
CPC ............. *B62D 1/184* (2013.01); *B62D 1/185* (2013.01)

(58) Field of Classification Search
CPC ................................ B62D 1/184; B62D 1/185
See application file for complete search history.

(56) References Cited

U.S. PATENT DOCUMENTS

| | | | |
|---|---|---|---|
| 9,501,082 B2 | 11/2016 | Anspaugh | |
| 9,586,610 B2 | 3/2017 | Figioli | |
| 9,649,932 B2 | 3/2017 | Vermeersch | |
| 2004/0113408 A1* | 6/2004 | Yamamoto | B62D 1/184 280/775 |
| 2017/0072987 A1* | 3/2017 | Dasadi | B62D 1/184 |

FOREIGN PATENT DOCUMENTS

| | | | | |
|---|---|---|---|---|
| EP | 2433847 A1 | * | 3/2012 | B62D 1/184 |
| WO | WO-2012172334 A1 | * | 12/2012 | B62D 1/187 |

* cited by examiner

*Primary Examiner* — Drew J Brown
(74) *Attorney, Agent, or Firm* — Dickinson Wright PLLC

(57) ABSTRACT

An adjustment mechanism for a steering column includes a lever rotatable to move the adjustment mechanism between a locked position and an unlocked position. The adjustment mechanism also includes a lever connector extending away from an inner face of the lever inwardly toward an axis of the steering column, the lever connector having a lever threaded portion. The adjustment mechanism further includes a cam located adjacent to the lever. The adjustment mechanism yet further includes a cam connector extending away from an outer face of the cam outwardly away from the axis of the steering column, the cam connector having a cam threaded portion engaged with the lever threaded portion to convert rotational motion of the lever to translational motion of the cam.

17 Claims, 5 Drawing Sheets

THREADED JOINT FOR STEERING COLUMN ADJUSTMENT MECHANISM

BACKGROUND

Steering columns are often manually adjustable to satisfy operator preferences. Such steering columns provide a release mechanism, such as a lever, that an operator can handle to move between a locked position and an unlocked position of the steering column. The locked position fixes the steering column in a stationary position. The unlocked position allows manual adjustment of the steering column.

In a typical manually adjustable steering column, an over-mold lever is commonly used to lock and unlock the steering column. Dowel pins may serve as an interface between the lever—or intermediate components—and a cam that is translated to clamp and unclamp a jacket of the steering column assembly. It is possible that the dowel pins may lead to sticking of the adjustment and could lead to overall column functionality issues.

SUMMARY OF THE DISCLOSURE

According to an aspect of the disclosure, an adjustment mechanism for a steering column includes a lever rotatable to move the adjustment mechanism between a locked position and an unlocked position. The adjustment mechanism also includes a lever connector extending away from an inner face of the lever inwardly toward an axis of the steering column, the lever connector having a lever threaded portion. The adjustment mechanism further includes a cam located adjacent to the lever. The adjustment mechanism yet further includes a cam connector extending away from an outer face of the cam outwardly away from the axis of the steering column, the cam connector having a cam threaded portion engaged with the lever threaded portion to convert rotational motion of the lever to translational motion of the cam.

According to another aspect of the disclosure, a steering column assembly includes a lower jacket. The assembly also includes an upper jacket in telescoping engagement with the lower jacket. The assembly further includes an adjustment mechanism. The adjustment mechanism includes a lever rotatable to move the adjustment mechanism between a locked position and an unlocked position, the locked position fixing the upper jacket relative to the lower jacket. The adjustment mechanism also includes a cam located adjacent to the lever. The adjustment mechanism further includes a threaded joint operatively coupling the lever to the cam to convert rotational motion of the lever to translational motion of the cam.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, various embodiments of the invention disclosed herein are shown.

Figure 1:
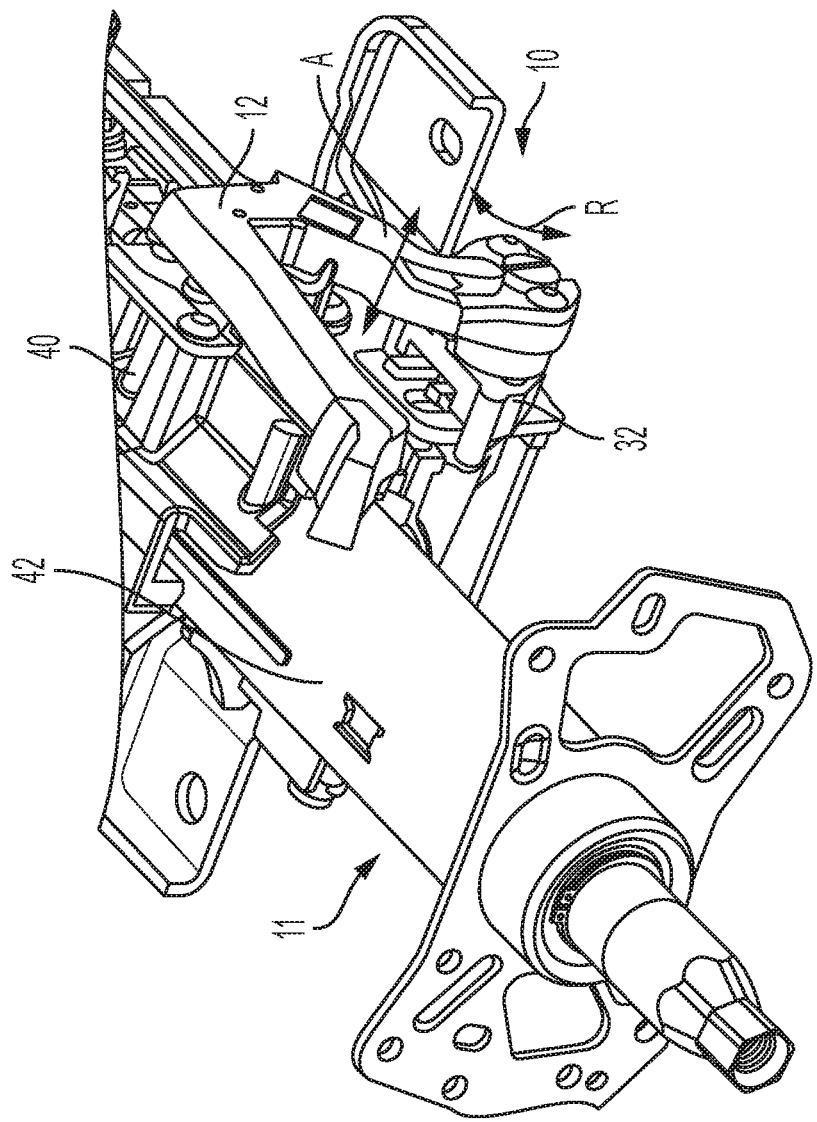
FIG. 1 is a first end perspective view of a steering column assembly.
Figure 2:
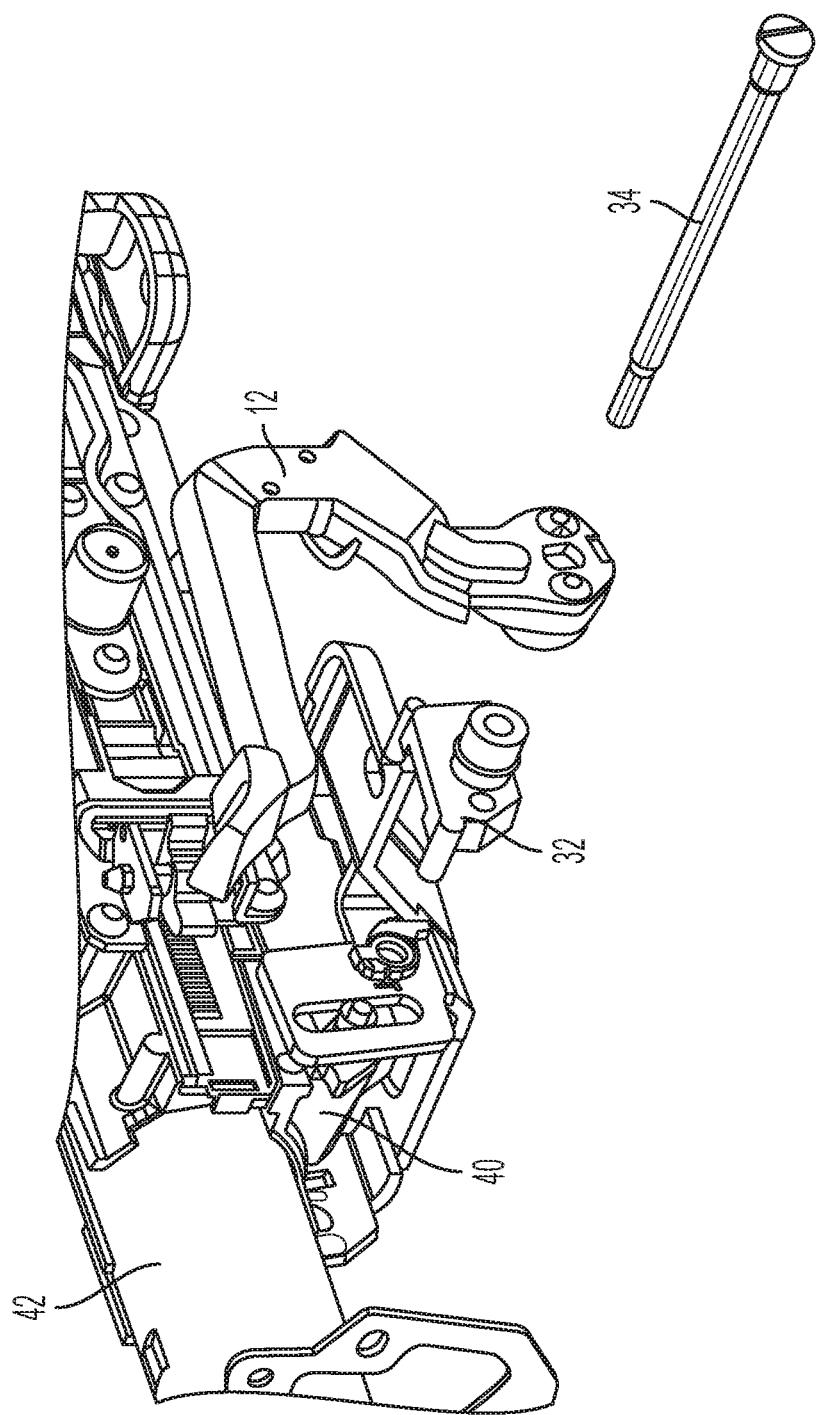
FIG. 2 is a side perspective view of the steering column assembly.

Referring to FIGS. 1 and 2, an adjustment mechanism 10 for a manually adjustable steering column 11 is shown. A rotatable lever 12 is configured to actuate the adjustment mechanism 10 between a locked condition and an unlocked condition. The rotatable lever 12 is an extension of the adjustment mechanism 10 into a cabin (not shown) of the motor vehicle, the lever 12 being accessible to a driver (not shown). The driver may engage the lever 12 in order to transition the steering column 11 from the locked condition to an unlocked condition or vice versa. In particular, the lever 12 is rotatable, as represented with directional arrow R (FIG. 1). In an unlocked condition, the position of the steering column 11 is adjustable and, when rotated into a locked condition, the position of the steering column is fixed.

The adjustment mechanism 10 also includes a cam 32 that is coupled to the lever 12 and a clamp bolt 34. The clamp bolt 34 extends through the lever 12 and the cam 32. The cam 32 is an instrument for converting rotation of the lever 12 to a linear force to clamp the steering column assembly. In particular, the cam 32 is translated in direction A (FIG. 1) to exert a clamping force on a lower jacket 40. An upper jacket 42 is in telescoping engagement within the lower jacket 40. The telescope capability of the upper jacket 42 and the rake adjustment capability of the lower jacket 40 are selectively locked and unlocked with the adjustment mechanism 10.

Figure 3:
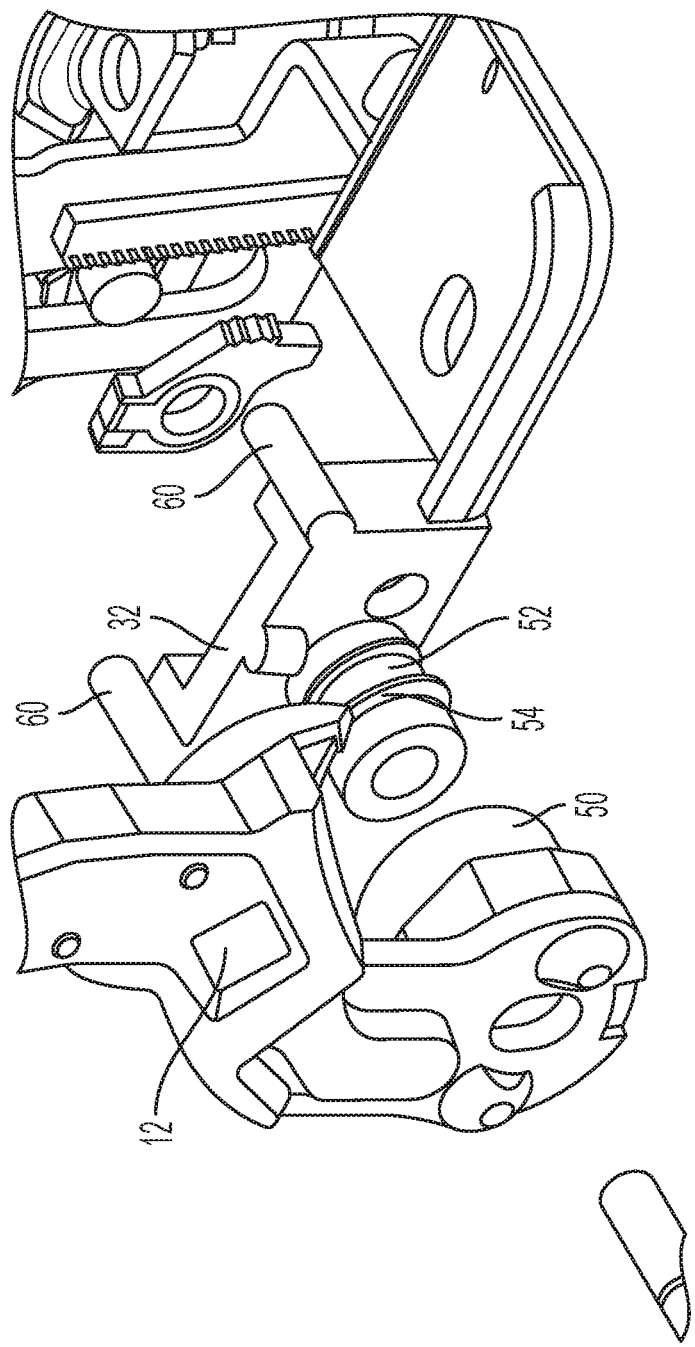
FIG. 3 is a partially disassembled view of an adjustment mechanism of the steering column assembly.
Figure 4:
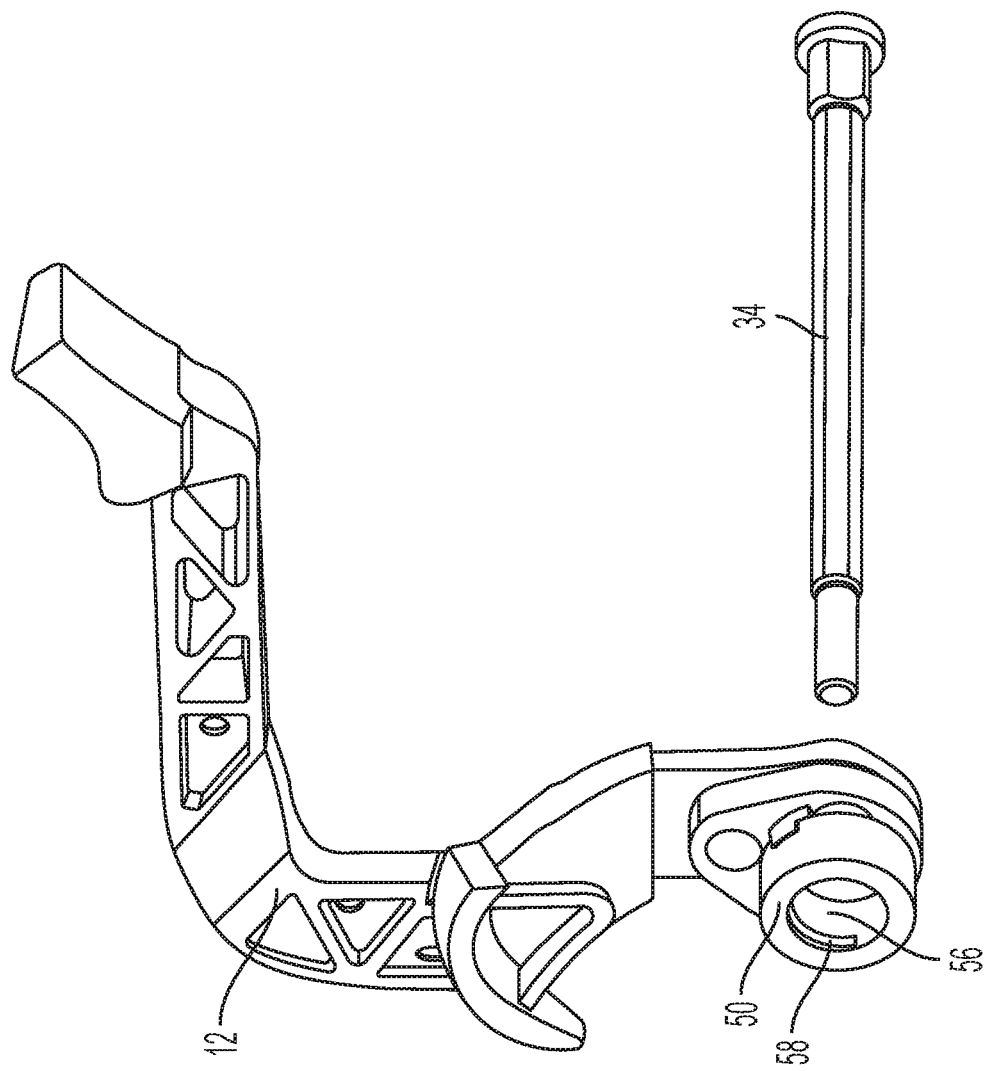
FIG. 4 is a perspective view of a portion of the adjustment mechanism.

Referring now to FIGS. 3 and 4, an interface between the lever 12 and the cam 32 is illustrated in greater detail. The interface between these components is a threaded joint. As shown, at the lever's axis of rotation, the lever 12 includes a lever connector 50 that extends from an inner face of the lever 12 toward the cam 32. The lever connector 50 is integrally formed with the lever 12. The cam 32 includes a cam connector 52 that extends from an outer face of the cam 32 toward the lever 12. The cam is integrally formed with the cam 32.

As shown clearly in FIG. 3, the cam connector 52 includes a first thread portion 54 on a radially outer surface of the cam connector 52. As shown in FIG. 4, the first thread portion 54 is configured to be in threaded engagement with a second thread portion 56 that is disposed on the lever connector 50.

The threaded connection between the lever connector 50 and the cam connector 52 may be made in any suitable manner. For example, in the illustrated embodiment the lever connector 50 includes an aperture, or cavity, defined by an inner wall 58, with the second thread portion 56 (i.e., lever connector thread) being located along the inner wall 58. In such a configuration, the cam connector 52 is at least partially disposed within the aperture of the lever connector 50, with the male threads of the first thread portion 54 being engaged with the female threads of the second thread portion 56. However, it is contemplated that alternative embodiments may include the lever connector 50 having threads on an outer surface and being disposed within an aperture of the cam connector 52 to form the threaded joint. Irrespective of the precise threaded joint configuration, the connection described herein results in the cam connector 52 functioning as a lead screw. In other words, rotation of the lever 12, and therefore the lever connector 50, results in the rotational motion being converted to translation of the cam 32.

The thread joint formed by connection of the first thread portion 54 and the second thread portion 56 acts as a 3-dimensional cam. This is due to the cam 32 translating to compress the rake bracket. The pitch of the threading is responsible for the amount of lever 12 displacement and the cam 32 displacement. This may be customized to dictate the displacement of each component, which can provide different clamping forces.

Figure 5:
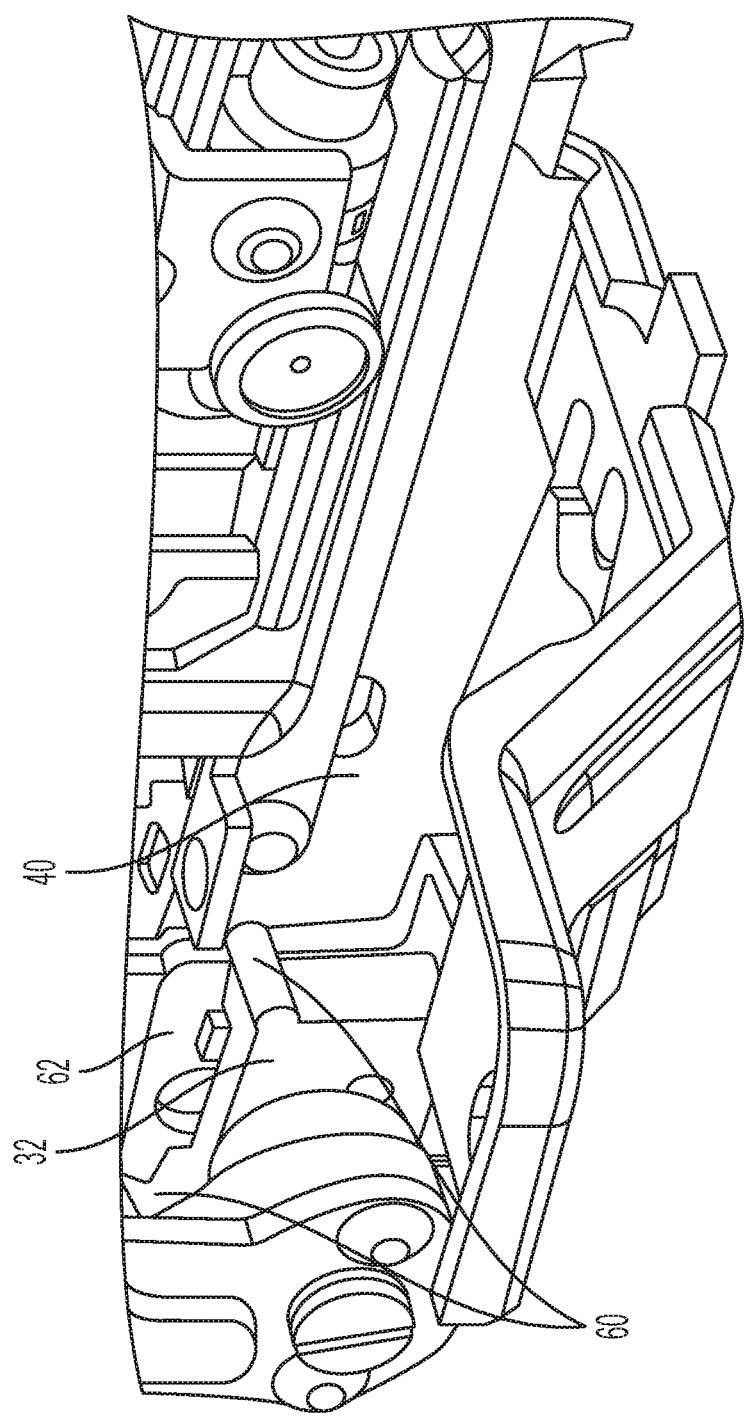
FIG. 5 is a perspective view of the adjustment mechanism.

Referring to FIGS. 3 and 5, to avoid rotation of the cam 32, the cam 32 includes at least two posts 60 that are secured to one or more rotationally fixed objects. For example, the posts 60 may be inserted within a hole defined by the lower jacket 40, a rake bracket 62 and/or any other adjacent structure that is rotationally fixed. By providing two fixed points of attachment, the cam 32 will not rotate in response to rotation of the lever 12 and will purely translate to carry out the desired clamping effect or release of such a clamping effect.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An adjustment mechanism for a steering column comprising:
    a lever rotatable to move the adjustment mechanism between a locked position and an unlocked position;
    a lever connector extending away from an inner face of the lever inwardly toward an axis of the steering column, the lever connector having a lever threaded portion;
    a cam located adjacent to the lever; and
    a cam connector extending away from an outer face of the cam outwardly away from the axis of the steering column, the cam connector having a cam threaded portion engaged with the lever threaded portion to convert rotational motion of the lever to translational motion of the cam.

2. The adjustment mechanism of claim 1, wherein the cam includes at least two posts extending from a surface of the cam that is opposite the cam connector, the at least two posts disposed within a hole of a rotationally fixed structure of the steering column to prevent rotation of the cam.

3. The adjustment mechanism of claim 2, wherein the rotationally fixed structure is at least one of a lower jacket and a rake bracket.

4. The adjustment mechanism of claim 1, wherein the cam threaded portion is formed on an outer surface of the cam connector and the lever threaded portion is formed on an inner wall of the lever connector that defines a lever connector aperture.

5. The adjustment mechanism of claim 4, wherein the cam threaded portion is a male thread pattern and the lever threaded portion is a female thread pattern.

6. The adjustment mechanism of claim 1, wherein the lever threaded portion is formed on an outer surface of the lever connector and the cam threaded portion is formed on an inner wall of the cam connector that defines a cam connector aperture.

7. The adjustment mechanism of claim 6, wherein the lever threaded portion is a male thread pattern and the cam threaded portion is a female thread pattern.

8. The adjustment mechanism of claim 1, further comprising a clamp bolt extending through a lever connector aperture and through a cam connector aperture.

9. A steering column assembly comprising:
    a lower jacket;
    an upper jacket in telescoping engagement with the lower jacket; and
    an adjustment mechanism comprising:
        a lever rotatable to move the adjustment mechanism between a locked position and an unlocked position, the locked position fixing the upper jacket relative to the lower jacket;
        a cam located adjacent to the lever; and
        a threaded joint operatively coupling the lever to the cam to convert rotational motion of the lever to translational motion of the cam.

10. The steering column assembly of claim 9, wherein the threaded joint comprises:
    a lever connector extending away from an inner face of the lever inwardly toward an axis of the steering column, the lever connector having a lever threaded portion; and
    a cam connector extending away from an outer face of the cam outwardly away from the axis of the steering column, the cam connector having a cam threaded portion engaged with the lever threaded portion.

11. The steering column assembly of claim 10, wherein the cam includes at least two posts extending from a surface of the cam that is opposite the cam connector, the at least two posts disposed within a hole of a rotationally fixed structure of the steering column to prevent rotation of the cam.

12. The steering column assembly of claim 11, wherein the rotationally fixed structure is at least one of the lower jacket and a rake bracket.

13. The steering column assembly of claim 10, wherein the cam threaded portion is formed on an outer surface of the cam connector and the lever threaded portion is formed on an inner wall of the lever connector that defines a lever connector aperture.

14. The steering column assembly of claim 13, wherein the cam threaded portion is a male thread pattern and the lever threaded portion is a female thread pattern.

15. The steering column assembly of claim 10, wherein the lever threaded portion is formed on an outer surface of the lever connector and the cam threaded portion is formed on an inner wall of the cam connector that defines a cam connector aperture.

16. The steering column assembly of claim 15, wherein the lever threaded portion is a male thread pattern and the cam threaded portion is a female thread pattern.

17. The adjustment mechanism of claim 10, further comprising a clamp bolt extending through a lever connector aperture and through a cam connector aperture.

* * * * *